United States Patent
Maeda

(10) Patent No.: US 7,942,582 B2
(45) Date of Patent: May 17, 2011

(54) HUB UNIT FOR A DRIVING WHEEL

(75) Inventor: Toshiaki Maeda, Fujisawa (JP)

(73) Assignee: NSK Ltd., Tokyo (JP)

( * ) Notice: Subject to any disclaimer, the term of this patent is extended or adjusted under 35 U.S.C. 154(b) by 1438 days.

(21) Appl. No.: 10/571,429

(22) PCT Filed: Aug. 27, 2004

(86) PCT No.: PCT/JP2004/012780
§ 371 (c)(1),
(2), (4) Date: Mar. 10, 2006

(87) PCT Pub. No.: WO2005/026745
PCT Pub. Date: Mar. 24, 2005

(65) Prior Publication Data
US 2007/0053623 A1    Mar. 8, 2007

(30) Foreign Application Priority Data

Sep. 11, 2003  (JP) ................. 2003-320081
Sep. 18, 2003  (JP) ................. 2003-326931
Sep. 25, 2003  (JP) ................. 2003-334077

(51) Int. Cl.
F16C 41/00    (2006.01)
F16C 33/58    (2006.01)

(52) U.S. Cl. ...................... 384/448; 384/544

(58) Field of Classification Search .......... 384/448, 384/544; 73/494, 866.5; 324/173, 174
See application file for complete search history.

(56) References Cited

U.S. PATENT DOCUMENTS

| 4,948,277 | A  | * | 8/1990 | Alff ................ 384/448 |
| 5,287,738 | A  |   | 2/1994 | Polinsky et al. |
| 5,567,058 | A  |   | 10/1996 | Morita et al. |
| 5,594,334 | A  | * | 1/1997 | Sonnerat et al. ......... 324/173 |
| 6,605,938 | B1 | * | 8/2003 | Sentoku et al. ......... 324/174 |
| 2004/0136628 | A1 | * | 7/2004 | Inoue .................. 384/448 |

FOREIGN PATENT DOCUMENTS

JP    3-17324 U    2/1991

(Continued)

OTHER PUBLICATIONS

European Search Report dated Nov. 27, 2008 (four (4) pages).

(Continued)

Primary Examiner — William C Joyce
(74) Attorney, Agent, or Firm — Crowell & Moring LLP

(57) ABSTRACT

A sensing part 35 of a sensor 30 for detecting speed of rotation is disposed to face a magnetic encoder 10 through a sensor holder 20, the sensor 30 for detecting the speed of rotation is disposed inward in the radial direction of a hub unit mounting hole NH of the knuckle N of a car body, a connecting portion 34a of a harness 34 is provided with deformation tolerance for allowing deformation of the shape when a load exceeding a predetermined level is applied thereon externally and a shape retaining capacity for retaining and maintaining the shape always as it is when the load is not higher than the predetermined level, and the connecting portion 34a of the harness 34 is, when the load is not higher than the predetermined level, positioned more on the outer diameter side than the outer diameter of a constant velocity universal joint 9 at least until the connecting portion 34a is located out of the hub unit mounting hole NH of the knuckle N.

2 Claims, 10 Drawing Sheets

FOREIGN PATENT DOCUMENTS

| | | |
|---|---|---|
| JP | 3-39161 U | 4/1991 |
| JP | 5-66227 A | 3/1993 |
| JP | 7-502824 A | 3/1995 |
| JP | 8-29440 A | 2/1996 |
| JP | 11-2640 A | 1/1999 |
| JP | 11-23596 A | 1/1999 |
| JP | 2000-346858 A | 12/2000 |
| JP | 2001-241435 A | 7/2001 |
| JP | 2003-120703 A | 4/2003 |
| JP | 2003-254985 A | 9/2003 |
| WO | WO 03/033277 A1 | 4/2003 |

OTHER PUBLICATIONS

International Search Report dated Dec. 21, 2004 w/ English Translation of Relevant Portion (Four (4) pages).

Japanese office action dated Mar. 9, 2010 with English translation.

Japanese Office Action dated Dec. 8, 2009 with English translation (eight (8) pages).

* cited by examiner

HUB UNIT FOR A DRIVING WHEEL

TECHNICAL FIELD

The present invention relates to a hub unit for a driving wheel for rotatably supporting the driving wheel with respect to a suspension system of a vehicle and provided with a sensor for detecting a speed of rotation of a wheel.

BACKGROUND ART

A hub unit for a driving wheel is arranged to support a hub and an inner race to be rotatable through a plurality of rolling elements on the inner diameter side of an outer race of a bearing.

The outer race is fixed to a knuckle for constituting a suspension system by means of a supporting flange provided on the outer peripheral surface thereof. A plurality of outer race tracks are provided on the inner peripheral surface of the outer race, and the hub and the inner race are supported on the inner diameter side of the outer race.

The hub is provided with a mounting flange for mounting the wheel in the outer end portion thereof. A first inner race track is formed in a middle part of the outer peripheral surface of the hub. An inner race is fixedly fitted on a small-diameter step portion of an inner end portion of the hub. This inner race is formed with a second inner race track. At the center of the hub, for example, in case of the hub unit for a driving wheel, a female spline for bringing a constant velocity universal joint into spline-fitting is provided.

There is also a hub unit with a sensor for detecting a speed of rotation of the wheel in order to rotatably support the wheel with respect to the suspension system and also to control an anti-lock brake system (ABS) or a traction control system (TCS).

When this hub unit is in use, a magnetic rubber encoder which is fixed to the inner race and which is magnetized to have alternately a plurality of north poles and south poles is rotated upon rotation of the wheel, and an output of the sensor disposed to face the magnetic rubber encoder is changed. Since the frequency of this output change is proportional to the speed of rotation of the wheel, an output signal of the sensor is inputted to a control unit through a harness to obtain the speed of rotation of the wheel, thereby appropriately controlling the ABS or the TCS.

Incidentally, such a hub unit as of the above-described type is, after the magnetic rubber encoder or the like is mounted on the inner race of the bearing, transported as a unitary hub unit, and the outer race thereof is fixed to a knuckle of the car body with a bolt or the like in an assembly process of the car. Then, the hub unit is mounted on the car body side.

However, it is conventionally arranged such that, in the hub unit for the driving wheel, the sensor for detecting the speed of rotation of the wheel is mounted on the side of the knuckle of the car body.

Accordingly, it is required to examine whether or not a positional relationship between the sensor for detecting the speed of rotation on the knuckle side and the magnetic rubber encoder on the hub unit side is appropriate and to adjust it. As a result, the assembling and adjusting processes become complicated.

For these reasons, there is a demand that the sensor for detecting the speed of rotation should also be mounted on the hub unit side in advance, in the same manner as the magnetic rubber encoder.

However, since the constant velocity universal joint is provided on the inner side of the hub unit in the car width direction, a space for mounting this sensor is comparatively small, so that it is difficult to mount the sensor for detecting speed of rotation on the hub unit side. Moreover, it is very troublesome to receive the harness which is extended from the sensor or to prevent interference thereof with the constant velocity universal joint.

DISCLOSURE OF THE INVENTION

The present invention has been contrived taking such circumstances as described above into consideration, and an object thereof is to provide a hub unit for a driving wheel which is provided with a sensor for detecting the speed of rotation and can be mounted on a knuckle very easily in an appropriate manner.

In order to achieve the above object, according to a first aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner element has the other of the inner race tracks on the outer peripheral surface thereof and is fitted on said small-diameter step portion, which hub unit characterized in that:

a sensor for detecting the speed of rotation is engaged with a sensor holder to be held thereon;

the sensor for detecting the speed of rotation is disposed to face a magnetic encoder with a sensing part inserted in a hole of said sensor holder;

the sensor for detecting the speed of rotation is disposed inward in the radial direction of a hole for mounting the hub unit of the knuckle of a car body;

a connecting portion of the harness for taking out a detection signal from the sensor is provided with deformation tolerance for allowing deformation of the shape when a load exceeding a predetermined level is applied thereon externally and a shape retaining capacity for retaining and maintaining the shape always as it is when the load is not higher than the predetermined level; and the connecting portion of the harness is, when the load is not higher than the predetermined level, positioned more on the outer diameter side than the outer diameter of a constant velocity universal joint at least until the connecting portion is located out of the hole for mounting the hub unit of the knuckle.

According to a second aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner element has the other of the inner race tracks on the outer peripheral surface thereof and is fitted on said small-diameter step portion, which hub unit further comprising:

a sensor holder fixed to the stationary race of the hub unit for a driving wheel; and a sensor which faces an encoder fixed to said rotary race to rotate, wherein:

a connecting portion of the sensor is extended from the sensor;

a sensor unit contains said sensor and said connecting portion;

all portion of the sensor unit outside the outer race in the axial direction and in a range of the hub mounting hole of the knuckle are disposed on the more inner side in the radial direction than the inner wall of the hub mounting hole of said knuckle;

the connecting portion of said sensor is disposed outside in the radial direction in a non-contact manner with respect to the constant velocity universal joint in a finished car;

said sensor is an active sensor; and said sensor unit has sensor elements disposed in circumferential direction thereof.

According to a third aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner element has the other of the inner race tracks on the outer peripheral surface thereof and is fitted on said small-diameter step portion, which hub unit further comprising:

a sensor holder fixed to the stationary race of the hub unit for a driving wheel; and a sensor which faces an encoder fixed to said rotary race to rotate, wherein:

a connecting portion of the sensor is extended from the sensor;

a sensor unit contains said sensor and said connecting portion;

all portion of the sensor unit outside the outer race in the axial direction and in a range of the hub mounting hole of the knuckle are disposed on the more inner side in the radial direction than the inner wall of the hub mounting hole of said knuckle;

the connecting portion of said sensor is disposed outside in the radial direction in a non-contact manner with respect to the constant velocity universal joint in a finished car;

a sensing portion of said sensor is directly opposed to said encoder;

said encoder is provided inside an air-tightly sealed space; and said sensor is an active sensor.

According to a fourth aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner race element has the other of the inner race tracks on the outer peripheral surface thereof and is fitted on said small-diameter step portion, which hub unit further comprising:

a sensor holder fixed to the stationary race of the hub unit for a driving wheel; and a sensor which faces an encoder fixed to said rotary race to rotate, wherein:

a connecting portion of the sensor is extended from the sensor;

a sensor unit contains said sensor and said connecting portion;

all portion of the sensor unit outside the outer race in the axial direction and in a range of the hub mounting hole of the knuckle is disposed on the more inner side in the radial direction than the inner wall of the hub mounting hole of said knuckle;

the connecting portion of said sensor is disposed outside in the radial direction in a non-contact manner with respect to the constant velocity universal joint in a finished car;

said encoder is covered with a cover fixed to the outer race;

said sensor unit is detachably mounted on said cover; and said sensor is an active sensor.

According to a fifth aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner element has the other of the inner race tracks on the outer peripheral surface thereof and is fitted on said small-diameter step portion, which hub unit further comprising:

a sensor holder fixed to the stationary race of the hub unit for a driving wheel; and a sensor which faces an encoder fixed to said rotary race to rotate, wherein:

a connecting portion of the sensor is extended from the sensor;

a sensor unit contains said sensor and said connecting portion;

the connecting portion of said sensor is disposed outside in the radial direction in a non-contact manner with respect to the constant velocity universal joint in a finished car;

a sensing portion of said sensor is directly opposed to said encoder;

said encoder is provided inside an air-tightly sealed space;

said hub unit as it is provided with said sensor unit is attached into the hub unit mounting hole of the knuckle; and said sensor is an active sensor.

According to a sixth aspect of the present invention, there is provided a hub unit for a driving wheel, in which:

one of a stationary race and a rotary race is an outer race having a plurality of outer race tracks on the inner peripheral surface thereof;

the other of the stationary race and the rotary race is an inner race assembly having a shaft member and an inner race element combined with each other and a plurality of inner race tracks on the outer peripheral surface thereof;

the shaft member is formed in a middle part in the axial direction thereof with one of the inner race tracks and at an end portion in the axial direction thereof with a small-diameter step portion having a smaller diameter than that of the inner race track portion; and said inner element has the other of the inner race tracks on the outer peripheral surface thereof and is fitted on said small-diameter step portion, which hub unit characterized in that:

a sensor for detecting the speed of rotation is engaged with a sensor holder to be held thereon;

the sensor for detecting the speed of rotation is disposed to face a magnetic encoder with a sensing part inserted in a hole of said sensor holder;

the sensor for detecting the speed of rotation is disposed inward in the radial direction of a hole for mounting the hub unit of the knuckle of a car body;

a connecting portion of the harness for taking out a detection signal from the sensor is provided with deformation tolerance for allowing deformation of the shape when a load exceeding a predetermined level is applied thereon externally and a shape retaining capacity for retaining and maintaining the shape always as it is when the load is not higher than the predetermined level; and said harness is extended outwardly through a radial hole formed on said knuckle.

As described above, according to the first aspect of the present invention, the sensor for detecting the speed of rotation is engaged with the sensor holder to be held thereon, the sensor for detecting the speed of rotation is disposed to face the magnetic encoder with the sensing part inserted in the hole of said sensor holder, the sensor for detecting the speed of rotation is disposed inward in the radial direction of the hole for mounting the hub unit of the knuckle of the car body, the connecting portion of the harness for taking out a detection signal from the sensor is provided with the deformation tolerance for allowing deformation of the shape when a load exceeding a predetermined level is applied thereon externally and the shape retaining capacity for retaining and maintaining the shape always as it is when the load is not higher than the predetermined level, and the connecting portion of the harness is, when the load is not higher than the predetermined level, positioned more on the outer diameter side than the outer diameter of the constant velocity universal joint at least at a position at which the connecting portion is located inside the hole for mounting the hub unit of the knuckle. As a result, since the connecting portion of the harness does not interfere with the constant velocity universal joint, the connecting portion of the harness is not damaged by a rotation of the constant velocity universal joint.

MOST PREFERRED EMBODIMENTS OF THE INVENTION

A hub unit for a driving wheel according to an embodiment of the present invention will be described below with reference to drawings.

(Whole Structure of a Hub Unit for a Driving Wheel)

Figure 1:
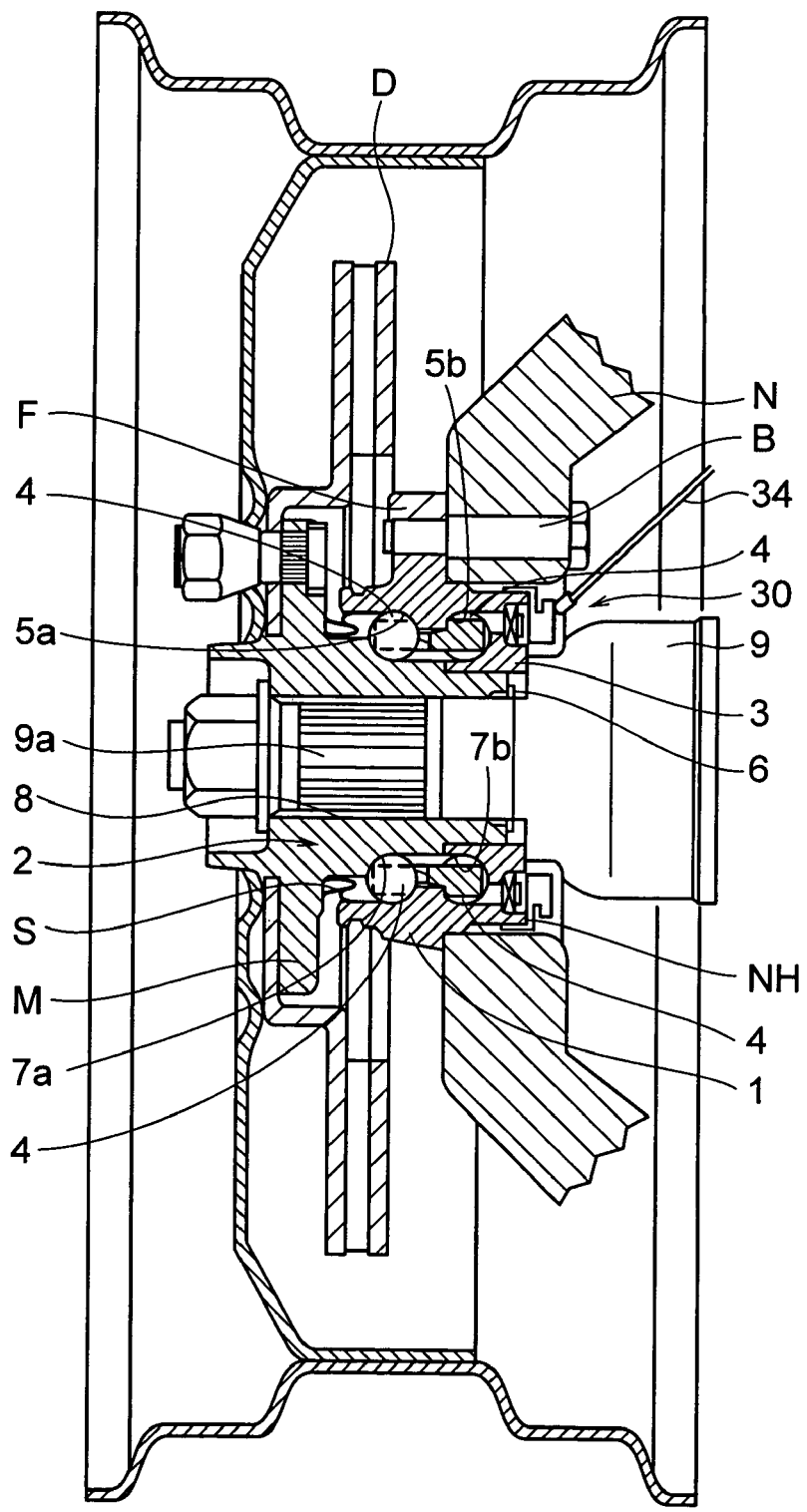
FIG. 1 is a longitudinal sectional view of a hub unit for a driving wheel to which the present invention is applied.

FIG. 1 is a longitudinal sectional view of a hub unit for a driving wheel to which the present invention is applied, which is common to all of the embodiments described below.

In the hub unit for a driving wheel, a hub 2 for a driving wheel and an inner race element 3 are rotatably supported on the inner diameter side of an outer race 1 through a plurality of rolling elements 4.

The outer race 1 is fixedly connected to a knuckle N for forming a suspension system by means of a bolt B through a supporting flange F which is integrally provided on the outer peripheral portion thereof. A part of the outer race 1 is, as shown in FIG. 1, inserted in a hub unit mounting hole NH of the knuckle.

A plurality of outer race tracks 5a, 5b are provided on the inner peripheral surface of the outer race 1, and the hub 2 for a driving wheel and the inner race element 3 are supported on the inner diameter side of this outer race 1.

The hub 2 for a driving wheel is integrally provided with a mounting flange M for mounting a wheel W and a brake disc D onto the outer periphery of an outer end portion which is positioned on the outer side of the car body (on the left side in the drawing) at mounting.

A first inner race track 7a is formed in a middle part of the outer peripheral surface of the hub 2 for a driving wheel. An inner race element 3 is fixedly fitted on a small-diameter step portion 6 which is formed to be cylindrical in an inner end portion in the same manner, and a second inner race track 7b is formed on this inner race element 3.

A female spline 8 is formed on the inner peripheral surface in the radial direction of the hub 2 for a driving wheel, and a male spline shaft 9a of a constant velocity universal joint 9 is brought into spline-fitting with this female spline 8 to be fixed there.

A seal member S is interposed between the outer peripheral surface of the hub 2 and the outward end portion of the outer race 1.

First Embodiment

Figure 2:
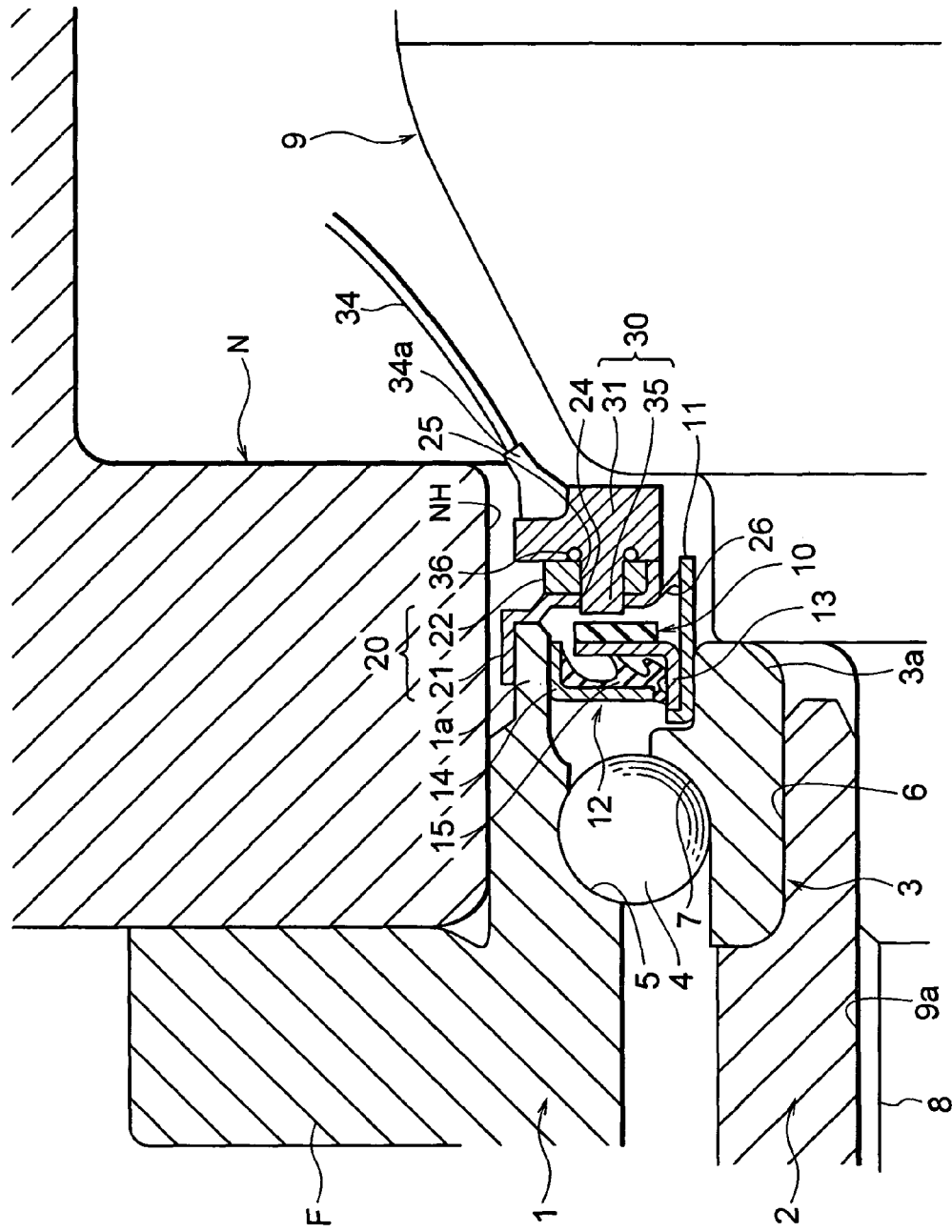
FIG. 2 is a sectional view of an essential part of the hub unit for a driving wheel shown in FIG. 1.

FIG. 2 is a sectional view of an essential part of the hub unit for a driving wheel shown in FIG. 1.

Figure 3:
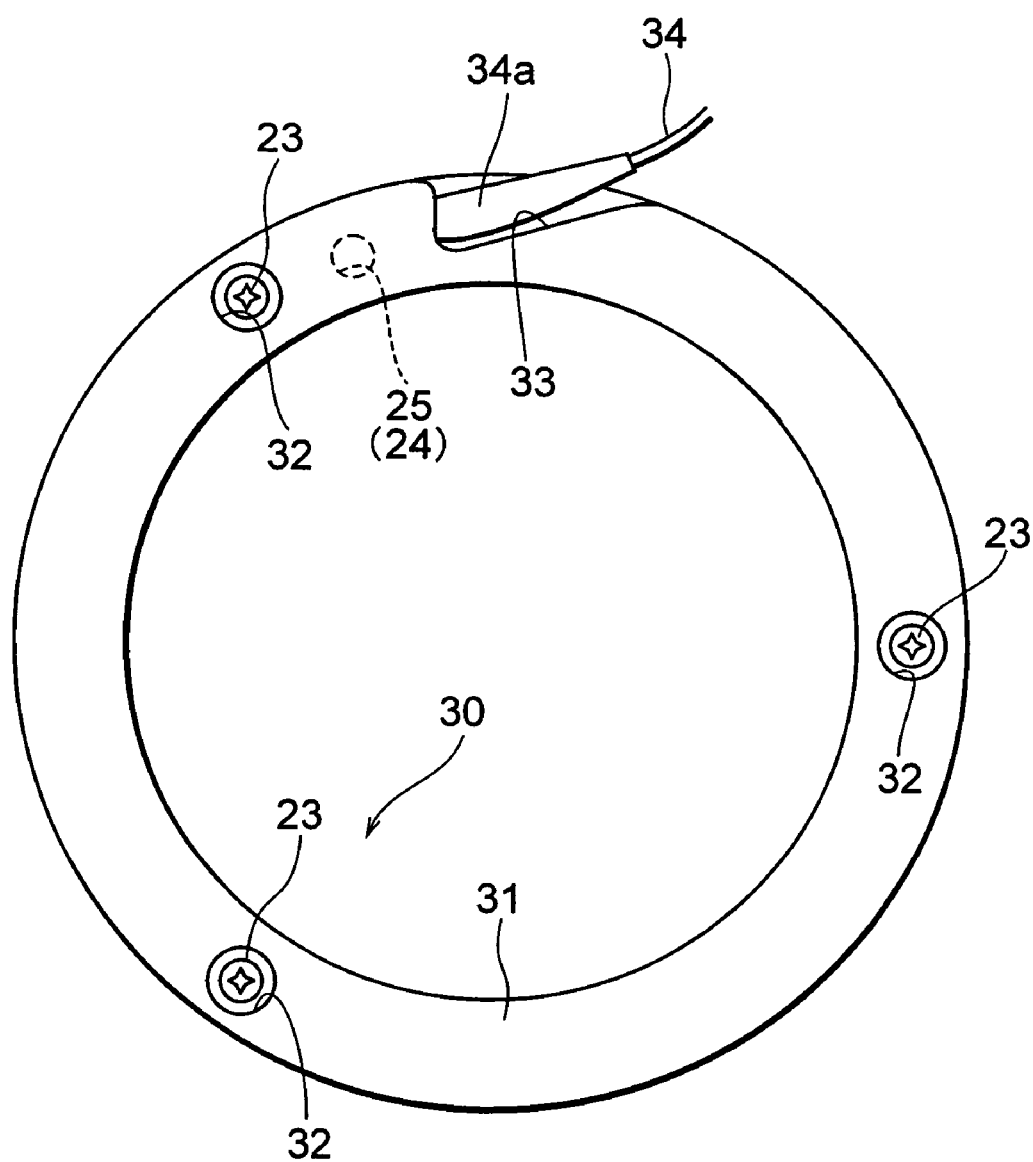
FIG. 3 is a side view of a sensor for detecting the speed of rotation shown in FIG. 2.

FIG. 3 is a side view of a sensor for detecting the speed of rotation shown in FIG. 2.

In the first embodiment, on the inner side in the car width direction of the inner race element 3 (on the right side in FIG. 2), there is formed a magnetic rubber encoder 10. This magnetic rubber encoder 10 is formed to be disc-like, and is magnetized to have alternately a plurality of north poles and south poles in the circumferential direction thereof.

The magnetic rubber encoder 10 is secured to a radially extended flange portion of a cylindrical core metal member 13 which has a cross section substantially in an L shape and is secured to a cylindrical member 11 fixed to an inner end portion 3a of the inner race element 3 in the car width direction. The magnetic rubber encoder 10 has a magnetized surface extended in the radial direction to face inwardly in the car width direction.

The core metal member 13 on the inner race side, a cylindrical core metal member 14 which is secured to the inner peripheral surface of the inner end portion 1a of the outer race 1 in the car width direction and which has a cross section substantially in an L shape, and a lip member 15 which is bonded to the core metal member 14 to carry out a sealing function together with the core metal member 13 constitute a seal member 12.

A sensor 30 is provided to face the magnetic rubber encoder 10 so as to detect the speed of rotation of the driving wheel.

In the present embodiment and in the subsequent embodiments, an active sensor employing a Hall element or an MR element is suitably used as the sensor for detecting the speed of rotation.

This sensor 30 for detecting the speed of rotation is mounted on the outer race 1 through a sensor holder 20 on the whole, and is positioned on the inner side in the radial direction of the hub unit mounting hole NH of the knuckle N so as not to interfere with the constant velocity universal joint 9.

Though being fixed to the outer race 1 through the sensor holder 20 and positioned on the inner side in the radial direction of the hub unit mounting hole NH of the knuckle N, the sensor 30 for detecting the speed of rotation does not come in contact with the knuckle N, while the knuckle N is not subjected to a special processing for mounting or a treatment for preventing interference.

The sensor holder 20 has a core metal member 21 which is press-fitted on the outer peripheral surface of the inner end portion 1a of the outer race 1 in the car width direction and a resin portion 22 which is formed integrally with this core metal member 21.

The sensor 30 for detecting the speed of rotation has, as also shown in FIG. 3, a sensor main body 31 which is formed to be annular. This sensor main body 31 has a comparatively large capacity for accommodating the constituent elements of the sensor, which resultantly causes no problem if the number of these constituent elements is great.

As shown in FIG. 3, the main body 31 is fastened to the resin portion 22 of the sensor holder 20 with a plurality of screws 23 (three screws in the illustrated example) and is engaged with the sensor holder 20 to be retained thereon. Engagement means of this sensor main body 31 with respect to the sensor holder 20 may be of any type including, for example, of a clip type or a press-fit type.

The sensor main body 31 is formed with a recessive hole 32 for receiving the head of the screw 13, in order to prevent the head of the screw 23 from interfering with the constant velocity universal joint 9.

As shown in FIG. 3, the sensor main body 31 is formed with a cut-away portion 33 from which a connecting portion 34a of a harness 34 for taking a detection signal from the sensor 30 is drawn out and extended.

The connecting portion 34a of the harness 34 is formed of such a material like resin or vinyl as having deformation tolerance for allowing deformation of the shape thereof when a load exceeding a predetermined level is applied externally and a shape retaining capacity for retaining and maintaining the shape always as it is when the load is not higher than the predetermined level or when no load other than the load due to its own weight (which may include the weight of the harness) is applied.

The connecting portion 34a of the harness 34 is maintained in its shape so that it is positioned more on the outer diameter side (in case of being in the same axial direction) than the outer diameter of the constant velocity universal joint 9 at least until it comes out of the hub unit mounting hole NH of the knuckle N.

With this arrangement, the connecting portion 34a of the harness 34 is positioned on the inner side in the radial direction of the hub unit mounting hole NH of the knuckle N, so as not to interfere with the constant velocity universal joint 9.

As described above, in the present embodiment, and in the subsequent embodiments, the sensor 30 for detecting the speed of rotation and the harness 34 for taking a detection signal from the sensor constitute the sensor unit.

As shown in FIG. 2, through holes 24 and 25 are formed respectively on the core metal member 21 and the resin portion 22 of the sensor holder 20, and a sensing portion 35 extended from the sensor main body 31 is inserted into these through holes 24 and 25.

A detection surface of this sensing portion 35 is arranged to be exposed from the core metal member 21 outwardly in the car width direction (on the left side in FIG. 2) so as to face the magnetized surface of the magnetic rubber encoder 10. With this arrangement, when the hub unit is in use, the magnetic rubber encoder 10 which is fixed to the inner race element is rotated upon rotation of the driving wheel, whereby an output of the sensor 30 which is disposed to face the magnetic rubber encoder 10 is changed. Since the frequency of this output change is in proportion to the speed of rotation of the driving wheel, an output signal from the sensor 30 can be supplied to a control apparatus (not shown) through the harness 34 to obtain the speed of rotation of the driving wheel, whereby the ABS or the TCS can be appropriately controlled.

It is possible to provide a plurality of sensing portions 35, or to attach a plurality of Hall ICs to a single sensing portion. A seal lip 26 is secured to the cylindrical member 11, and this seal lip is brought into contact with the core metal member 21 of the sensor holder 20 to form a seal member for air-tightly sealing, in order to protect the sensing portion 35 and the like. This portion may be a labyrinth seal. If the seal member comprises a labyrinth seal, there is a fear that rainwater or the like may enter the vicinity of the sensing portion 35, so that an outlet hole for discharging rainwater and the like is preferably formed in a lower part of the core metal member 21 of the sensor holder 20. A reference numeral 36 denotes an O ring for preventing water from entering the sensing portion 35 by sealing a space between the resin portion 22 and the sensor main body 31.

As described above, the magnetic rubber encoder 10 and the sensing portion of the sensor 30 which directly faces this encoder 10 are disposed in an air-tightly sealed space which is defined by the seal member 12, the sensor holder 20, the cylindrical member 11, and the like.

According to the first embodiment of the present invention, as described above, the sensor 30 for detecting the speed of rotation is attached to the outer race 1 through the sensor holder 20, and is positioned on the inner side in the radial direction of the hub unit mounting hole NH of the knuckle N so as not to interfere with the constant velocity universal joint 9. When the load is not more than a predetermined value, the connecting portion 34a of the harness 34 is maintained in its shape so as to be disposed more on the outer diameter side than the outer diameter of the constant velocity universal joint 9 at least until it comes out the mounting hole NH of the knuckle H. Note that, though the sensor 30 for detecting the speed of rotation is arranged to be positioned on the inner side in the radial direction of the hub unit mounting hole NH of the knuckle N, the positional relationship between the hub unit mounting hole NH and the sensor 30 is not limited to that shown in FIG. 2, but may be deviant wholly or partially in the axial direction.

Figure 4:
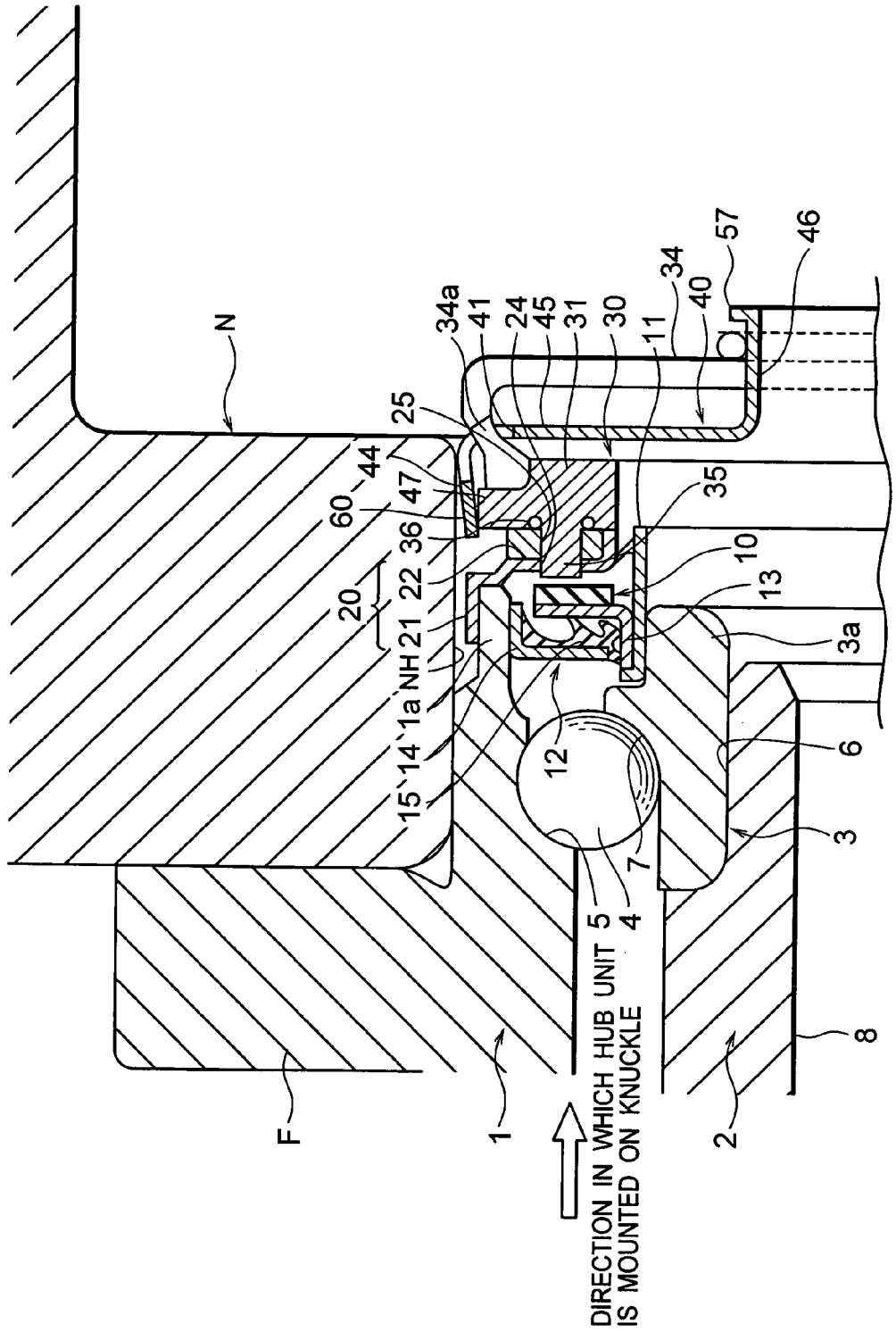
FIG. 4 is a sectional view of the essential part of the hub unit for a driving wheel according to a second embodiment of the present invention, for showing a state before the hub unit is mounted on the car.
Figure 5:
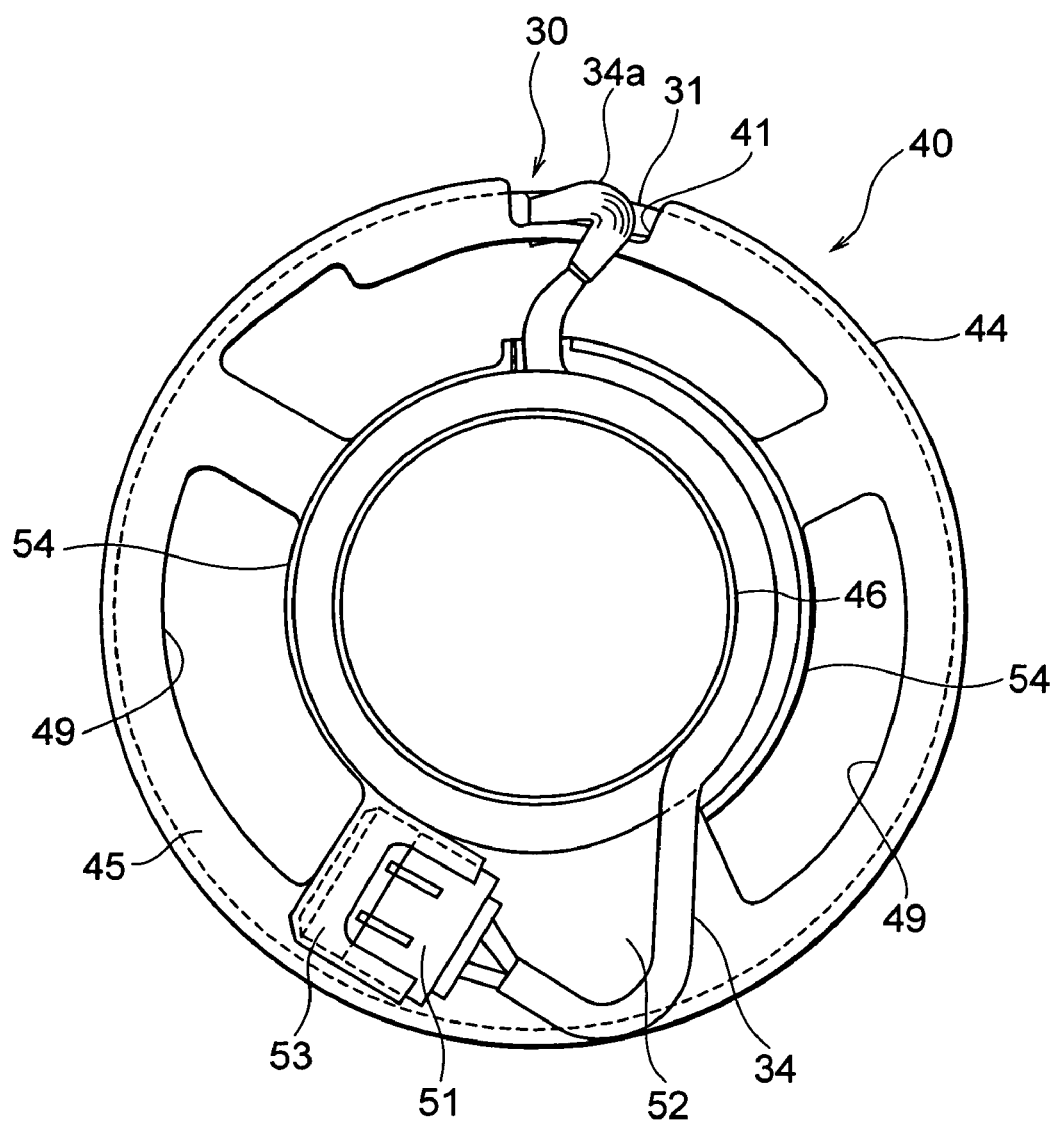
FIG. 5 is a side view of a harness holder shown in FIG. 4.

Next, FIG. 4 is a sectional view of the essential part of the hub unit for a driving wheel according to the second embodiment of the present invention, for showing a state before the hub unit is mounted on the car. FIG. 5 is a side view of a harness holder shown in FIG. 4.

The harness holder 40 is detachably mounted on the outer peripheral surface of the main body 31 of the sensor 30 for detecting the speed of rotation.

This harness holder 40 is integrally formed by injection molding of an elastic material such as synthetic resin, and is formed to have a crank-type cross section having a supporting cylinder 44, a continuous portion 45 and a winding cylinder 46 as a unitary structure. The whole shape of the harness holder 40 is disc-like.

The outer diameter of this harness holder 40 is set to be smaller than the inner diameter of the mounting hole NH of the knuckle N.

The supporting cylinder 44 is provided with several pawls 60 formed at several positions on the circumference thereof. The inner diameter of the pawl 60 in its free state is far smaller than the outer diameter of the sensor main body 31. An opening end portion on the inner peripheral surface of the pawl 60 forms a taper surface 47 which has a smaller inner diameter at a position nearer the end edge. As a result, this supporting cylinder 44 can be fixed and fitted on the sensor main body 31.

A material of the harness holder 40, the thickness and the width of the pawl 60 and a difference between the outer diameter of the sensor main body 31 and the inner diameter of the pawl 60 are so designed as to obtain the force of several kgf or around required for attaching and/or detaching the supporting cylinder 44 on and/or from the sensor main body 31.

The whole supporting cylinder 44 of the harness holder 40 may be formed to have a section like the pawl 60 described above, so as to be engaged with the sensor main body 31. In this case, however, the locking force is set on the level that the harness holder 40 can be removed manually after the hub unit is mounted on the knuckle N.

The continuous portion 45 is bent from the inner end edge of the supporting cylinder 44 and is then extended inwardly in the radial direction. This continuous portion 45 is formed with a plurality of through holes 49, 49, for the purpose of saving the cost of the synthetic resin material and reducing the weight of the harness holder 40.

A connector 51 is thrust into a flat portion 52 between two through holes 49, 49 which are adjacent to each other in the circumferential direction, so as to form a latching portion 53 which can latch this connector 51.

The winding cylinder 46 is formed along the inner periphery of the continuous portion 45 to be protruded on the opposite side to the supporting cylinder 44 in the axial direction. A streak 57 which is slightly protruded outwardly in the radial direction is formed along the entire outer periphery of the tip end portion of the winding cylinder 46.

In a part on one side of the continuous portion 45 and in the vicinity of the winding cylinder 46 there are formed arch-shaped walls 54, 54 which are concentric with the winding cylinder 46.

In case of the hub unit according to the present embodiment, it is possible to arrange the hub unit in such a manner that an elongated harness 34 does not droop prior to the completion of the mounting of the knuckle N into the mounting hole NH in the course of, for example, transportation, assembling work, or the like.

That is, prior to the completion of the mounting, the harness holder 40 is fitted on the sensor main body 31 by fitting the supporting cylinder 44 on the sensor main body 31.

The connector 51 is taken out onto the side of the winding cylinder 46 through the cut-away portion 41 of the harness holder 40 prior to the fitting operation of the harness holder 40. In this respect, with this cut-away portion 41, the harness holder 40 can be easily taken out.

After the harness holder 40 is fitted on the sensor main body 31, the harness 34 taken out onto the winding cylinder 46 side is wound around the winding cylinder 46.

The connector 51 connected to the tip end of this harness 34 is thrust into the latching portion 53, whereby the connector 51 is latched by this latching portion 53.

Since the length of the harness 34 is fixed, if the outer diameter of the winding cylinder 46 and the position of the latching portion 53 are appropriately controlled, a part of the harness 34 is not protruded outwardly in the radial direction from the outer peripheral surface of the supporting cylinder 44.

Since there are formed the arch-shaped walls 54, 54 around the harness 34 which is wound around the winding cylinder 46, the harness 34 is not released easily.

Since the elongated harness 34 is wound around the winding cylinder 46 in such a manner, the elongated harness 34 does not droop at the time of conveyance of the hub unit or of mounting of the hub unit in the mounting hole NH of the knuckle N. As a result, this harness 34 is not obstructive on this occasion.

When the hub unit is to be inserted into the mounting hole NH of the knuckle N, the connecting portion 34a of the harness 34 is bent as shown in FIG. 5, so as not to interfere the inner diameter of the mounting hole NH of the knuckle N or reduce the interference (so that the hub unit can be inserted into the mounting hole NH even if there is a little interference since the connecting portion 34a of the harness 34 is an elastic member).

The harness holder 40 is detached after the outer race 1 is mounted on a member on the suspension system side such as the mounting hole NH of the knuckle N. The detached harness holder 40 is sent to a manufacturing process of a rolling bearing unit with a detecting device of speed of rotation for the second time, if needed, at which the harness holder 40 is assembled in a hub unit newly manufactured.

Second Embodiment

Figure 6A:
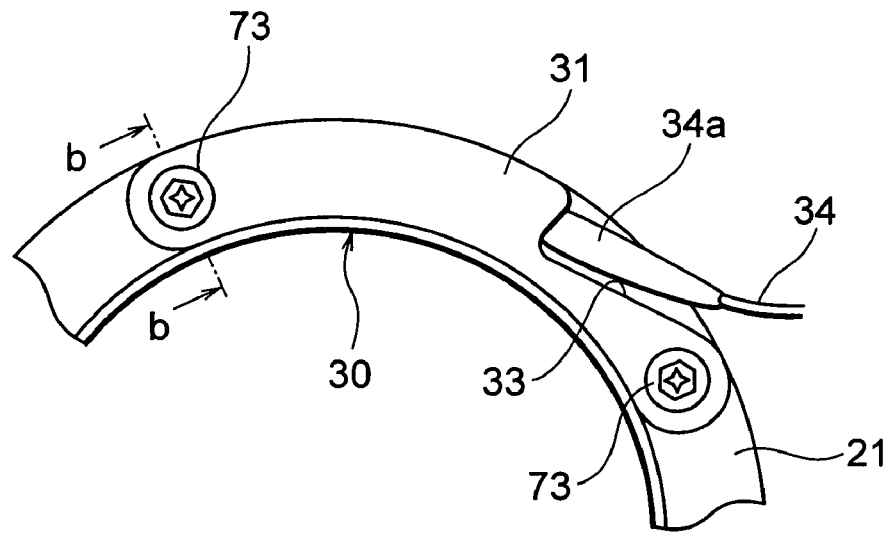
FIG. 6A is a side view of an essential part of the hub unit for a driving wheel according to a third embodiment of the present invention.
Figure 6B:
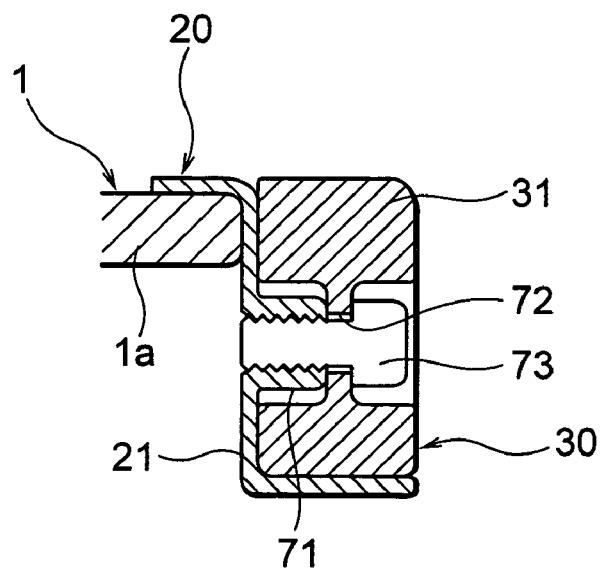
FIG. 6B is a sectional view taken along the line b-b in FIG. 6A.

FIG. 6A is a side view of an essential part of a hub unit for a driving wheel according to the second embodiment of the present invention, and FIG. 6B is a sectional view taken along the line b-b in FIG. 6A.

The basic structure of this second embodiment is substantially the same as that of the first embodiment, and the second embodiment is that same as the first embodiment in the state shown in FIG. 1. Thus, only the difference from the first embodiment will be described below.

In the second embodiment, as shown in FIG. 6A, the sensor main body 31 of the sensor 30 for detecting the speed of rotation is not formed to be annular, but substantially to be arch-shaped, and is extended in the circumferential direction. The sensor main body 31 is attached to the core metal member 21 of the sensor holder 20 at both ends thereof by means bolts 73 which will be described later.

As shown in FIG. 6B, the sensor holder 20 is not provided with the resin portion 22 which is provided in the first embodiment, and is constituted only by the core metal member 21. This core metal member 21 is formed with a burred portion 71 which is provided with a female screw on the inner periphery thereof for mounting the sensor main body 31.

When the sensor main body 31 is attached to the core metal member 21, the bolt 73 is inserted to be thread-engaged with the burred portion 71 which is provided with a female screw on the inner periphery thereof through a hole 72 of the sensor main body 31.

Figure 7A:
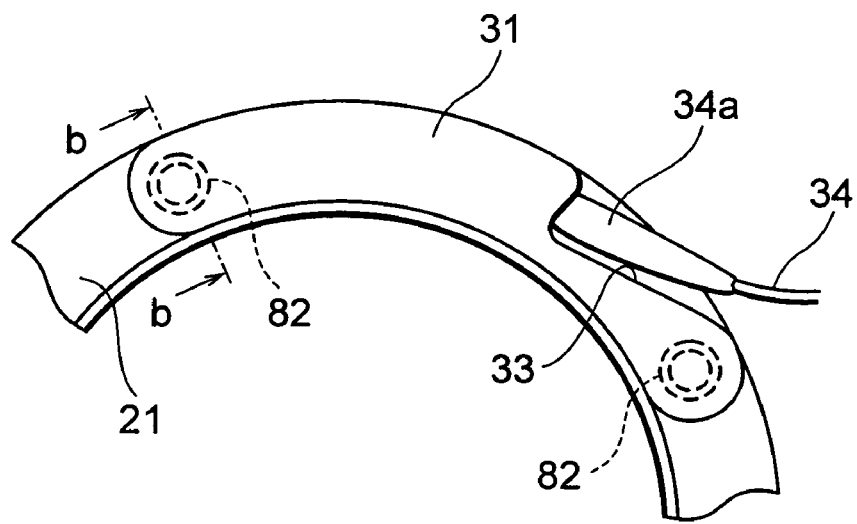
FIG. 7A is a side view of the essential part of the hub unit for a driving wheel according to the second embodiment of the present invention.
Figure 7B:
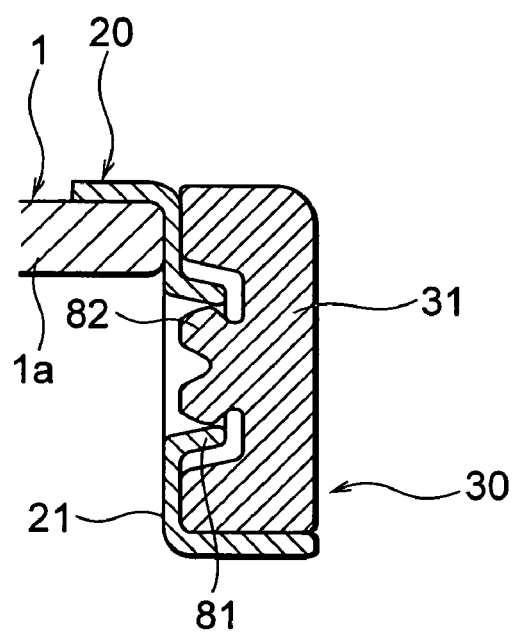
FIG. 7B is a sectional view taken along the line b-b in FIG. 7A.

FIG. 7A is a side view of an essential part of a hub unit for a driving wheel according to a variation of the second embodiment of the present invention, and FIG. 7B is a sectional view taken along the line b-b in FIG. 7A.

This variation is substantially the same as the second embodiment, so that only the difference from the second embodiment will be described. In stead of the bolt 73, a latch clip 82 is used in this variation. In this variation, the core metal member 21 is formed with a latch flange (which is formed by burring) 81, while the sensor main body 31 is formed with the latch clip 82 (snap clip) which is elastically deformable.

When the sensor main body 31 is mounted on the core metal member 21, the latch clip 82 of the sensor main body 31 is inserted into the latch flange 81 to be latched and fixed thereat.

Third Embodiment

Figure 8:
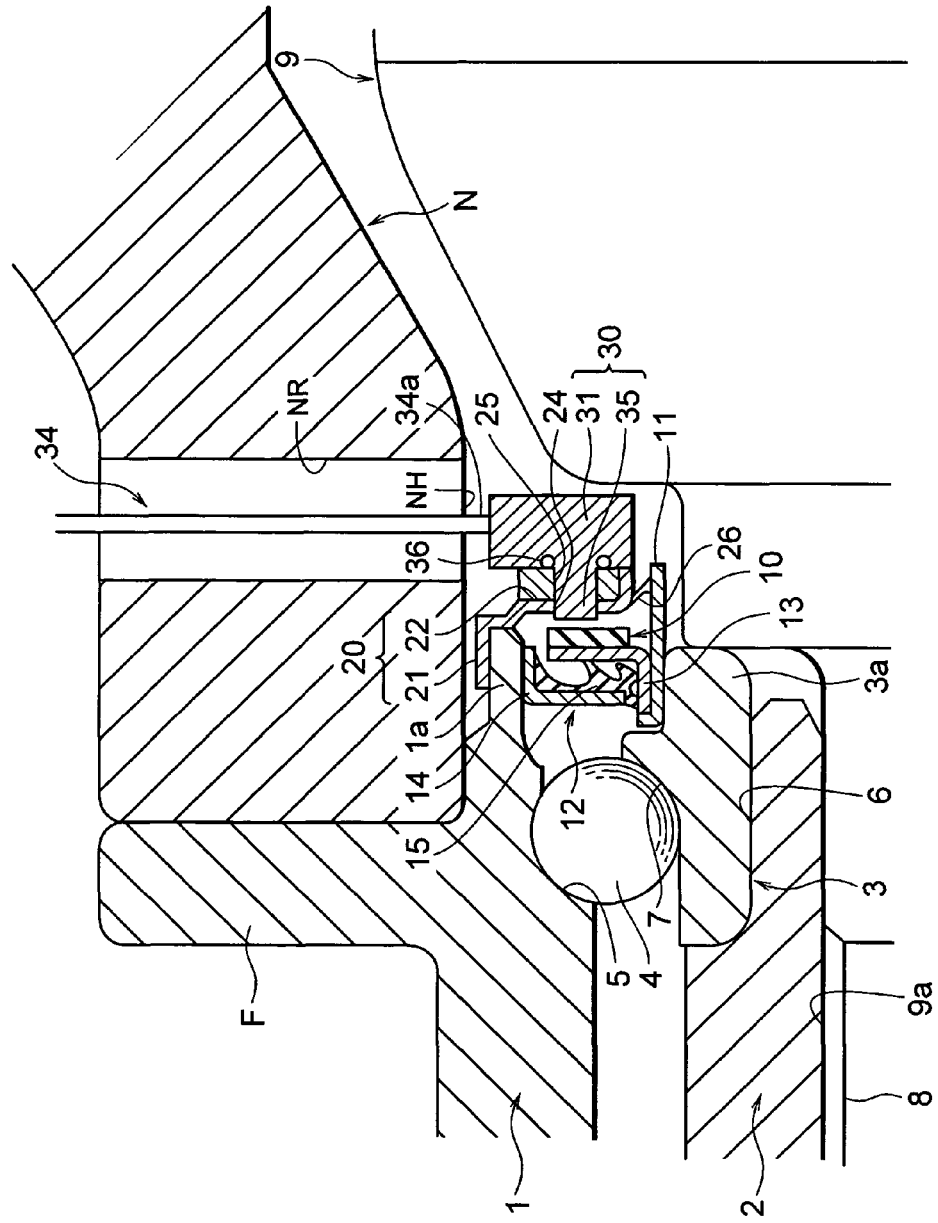
FIG. 8 is a sectional view of an essential part of the hub unit for a driving wheel according to a third embodiment of the present invention and shown in FIG. 1.

FIG. 8 is a sectional view of an essential part of the hub unit for a driving wheel according to the third embodiment of the present invention and shown in FIG. 1.

Figure 9:
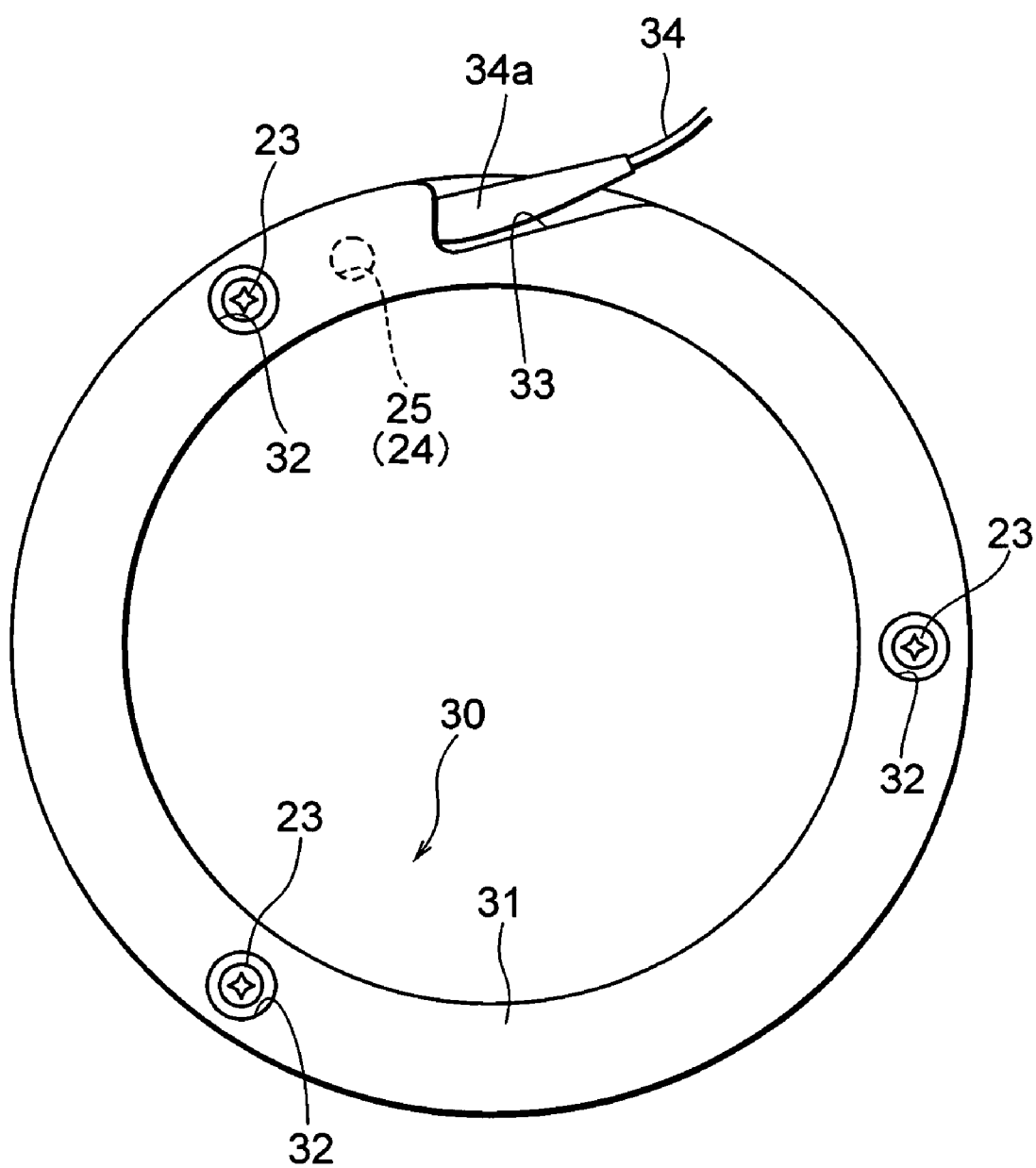
FIG. 9 is a side view of the essential part of the hub unit for a driving wheel shown in FIG. 8.

FIG. 9 is a side view of an essential part of the hub unit for a driving wheel shown in FIG. 8.

The basic structure of this third embodiment is substantially the same as that of the first embodiment described above, so that only the different arrangements from the first embodiment will be described below.

As shown in FIG. 8. in this third embodiment, compared with the first embodiment, the knuckle N is gradually bent more outwardly in the radial direction at a inner part in the car width direction to be formed as arch-shaped.

The knuckle N is formed with a radial hole NR which is extended to be through in the radial direction at a position corresponding to that of the sensor for detecting the speed of rotation in the radial direction outwardly.

Also, as shown in FIG. 9, the sensor main body 31 is formed with a cut-away portion 33, from which the connecting portion 34a of the harness 34 is taken out and extended.

In the third embodiment, this harness 34 is, as shown in FIG. 8, paid out outwardly in the radial direction from the connecting portion 34a, and then, inserted into the radial hole NR (through hole) of the knuckle N. However, the connecting portion 34a is arranged to be not in contact with the inner peripheral wall of the mounting hole NH of the hub unit.

The harness 34 is thereafter extended outwardly in the radial direction of the radial hole NR.

A part of the harness 34 may be pulled outwardly not only from the radial hole NR described above, but from a gap of the knuckle N present in the radial direction.

Figure 10:
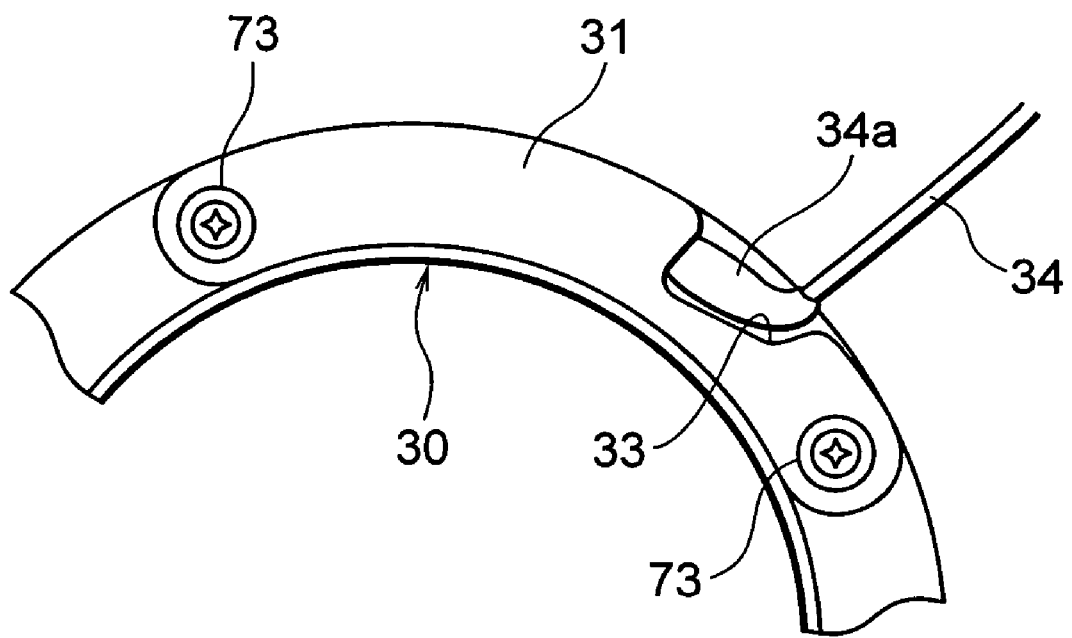
FIG. 10 is a side view of an essential part of a hub unit for a driving wheel according to a variation of the third embodiment.

Next, FIG. 10 is a side view of an essential part of a hub unit for a driving wheel according to a variation of the third embodiment.

The basic structure of this variation is substantially the same as that of the second embodiment described above, so that only the different arrangements from the first embodiment will be described below.

In this variation, the sensor main body 31 of the sensor 30 for detecting the speed of rotation is not formed to be annular, but to be substantially arch-like, and is extended in the circumferential direction. The sensor main body 31 is attached to the core metal member 21 of the sensor holder 20 at both ends thereof by mean of bolts 73.

Also in this variation, like in the third embodiment, the harness 34 is pulled from the connecting portion 34a outwardly in the radial direction, and then inserted into the radial hole NR (through hole) of the knuckle N. However, the connecting portion 34a is arranged not to be in contact with the inner peripheral wall of the mounting hole NH of the hub unit. The harness 34 is thereafter extended outwardly in the radial direction of the radial hole NR.

Note that the present invention is not limited to the foregoing embodiments, but can be altered in various manners.

What is claimed is:

1. A hub unit for a driving wheel, having a stationary race and a rotary race, one of the stationary and rotary races being an outer race having a plurality of outer race tracks on an inner peripheral surface thereof; the other of the stationary and rotary races being an inner race assembly having a shaft member and an inner race element combined with each other and a plurality of inner race tracks on an outer peripheral surface thereof, the shaft member being formed, in a middle part in an axial direction thereof, with one of the inner race tracks and, at an inner end portion in the axial direction thereof, with a step portion having a smaller diameter than those of the inner race tracks, and said inner race element having the other of the inner race tracks on the outer peripheral surface thereof and being fitted on said step portion having the smaller diameter, the hub unit comprising:

a first seal disposed inwardly relative to said stationary and rotary races to seal a bearing space formed between said stationary race and said rotary race;

a sensor holder attached to said stationary race and extending further inward than said first seal;

a sensor having a sensing portion for detecting a speed of rotation inserted in a hole of said sensor holder;

a magnetic encoder provided in said rotary race to face said sensing portion of said sensor; and a second seal fixedly provided on said rotary race further inward than said magnetic encoder to protect said sensing portion, the second seal having a seal lip in sliding contact with said sensor holder;

wherein said stationary race and said rotary race are an outer race and an inner race, respectively, a harness holder is removably fitted on an outer periphery of said sensor, said harness holder is formed of a supporting cylindrical portion having an engagement portion engaged with said outer periphery of said sensor, a winding cylindrical portion projected in an opposite direction to the supporting cylindrical portion to wind a harness, and a continuous portion connecting said supporting and winding cylindrical portions; and wherein an outer diameter of said harness holder is smaller than an inner diameter of a hole for mounting the hub unit of a knuckle of a car body, and said continuous portion of said harness holder is formed with a latching portion for latching a connector attached to an end of the harness.

2. A hub unit for a driving wheel according to claim 1, wherein a connecting portion of said harness, connected to said sensor to take out a detection signal from the sensor, is provided with deformation tolerance for allowing shape deformation when a load exceeding a predetermined level is applied thereon externally, and a shape retaining capacity for retaining and maintaining the shape always as it is when the load is not higher than the predetermined level; and wherein the load is not higher than the predetermined level, the connecting portion of the harness is positioned closer to an outer diameter side than an outer diameter of a constant velocity universal joint at least to a point at which the connecting portion is located out of the hole for mounting the hub unit of the knuckle.

* * * * *